United States Patent
Ho et al.

(10) Patent No.: US 8,730,649 B2
(45) Date of Patent: May 20, 2014

(54) AQUEOUS ELECTROLYTE SOLUTION FOR ELECTRIC DOUBLE-LAYER CAPACITOR AND ELECTRIC DOUBLE-LAYER CAPACITOR HAVING THE SAME

(75) Inventors: Wen-Hsien Ho, Tu-Chen (TW); Chung-Bo Tsai, Tu-Chen (TW); Shao-Wei Chieh, Tu-Chen (TW); Po-Chou Chen, Tu-Chen (TW); Chia-Hui Lee, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 390 days.

(21) Appl. No.: 13/340,854

(22) Filed: Dec. 30, 2011

(65) Prior Publication Data

US 2012/0106027 A1 May 3, 2012

Related U.S. Application Data

(63) Continuation-in-part of application No. 12/722,736, filed on Mar. 12, 2010, now Pat. No. 8,379,366.

(51) Int. Cl.
 *H01G 9/00* (2006.01)
 *H01G 9/02* (2006.01)

(52) U.S. Cl.
 USPC .......................................... 361/502; 252/62.2

(58) Field of Classification Search
 USPC ................... 361/502, 505; 252/62.2
 See application file for complete search history.

(56) References Cited

U.S. PATENT DOCUMENTS

| | | | |
|---|---|---|---|
| 3,652,902 A * | 3/1972 | Hart et al. | 361/502 |
| 6,535,373 B1 | 3/2003 | Smith et al. | |
| 7,189,475 B2 | 3/2007 | Sasaki et al. | |
| 7,955,868 B2 * | 6/2011 | Lotfi et al. | 438/3 |
| 2005/0175867 A1 | 8/2005 | Adachi et al. | |

FOREIGN PATENT DOCUMENTS

| | | |
|---|---|---|
| CN | 1408121 A | 4/2003 |
| CN | 1674347 A | 9/2005 |
| DE | 19533711 | 3/1996 |
| EP | 0850932 | 6/1998 |
| JP | 2002110226 | 4/2002 |
| JP | 2008269824 | 11/2008 |
| WO | 2006111079 | 10/2006 |
| WO | 2008020649 | 2/2008 |

OTHER PUBLICATIONS

English translation of abstract of WO 2008020649 (published Feb. 21, 2008).
English translation of abstract of JP 2008269824 (published Nov. 6, 2008).
English translation of abstract of JP 2002110226 (published Apr. 12, 2002).
English language translation of abstract of CN 1674347 A.
English language translation of abstract of CN 1408121 A.

(Continued)

*Primary Examiner* — David M Sinclair
(74) *Attorney, Agent, or Firm* — McClure, Qualey & Rodack, LLP

(57) ABSTRACT

A method for decreasing resistivity of an electrolyte for an electric double-layer capacitor is provided. In this method, an aqueous electrolyte solution comprising $LiNO_3$ and $LiOH$ in a molar ratio of 1:9 to 9:1 is prepared first, and then purged with nitrogen or oxygen. An electric double-layer capacitor having the gas-purging aqueous electrolyte solution above is also provided.

11 Claims, 1 Drawing Sheet

(56) References Cited

OTHER PUBLICATIONS

English language translation of abstract of DE 19533711 (published Mar. 14, 1996).

English language translation of abstract (on p. 3) of EP 0850932 (published Jun. 1, 1998).

English language translation of abstract of WO 2006111079 (published Oct. 26, 2006).

* cited by examiner

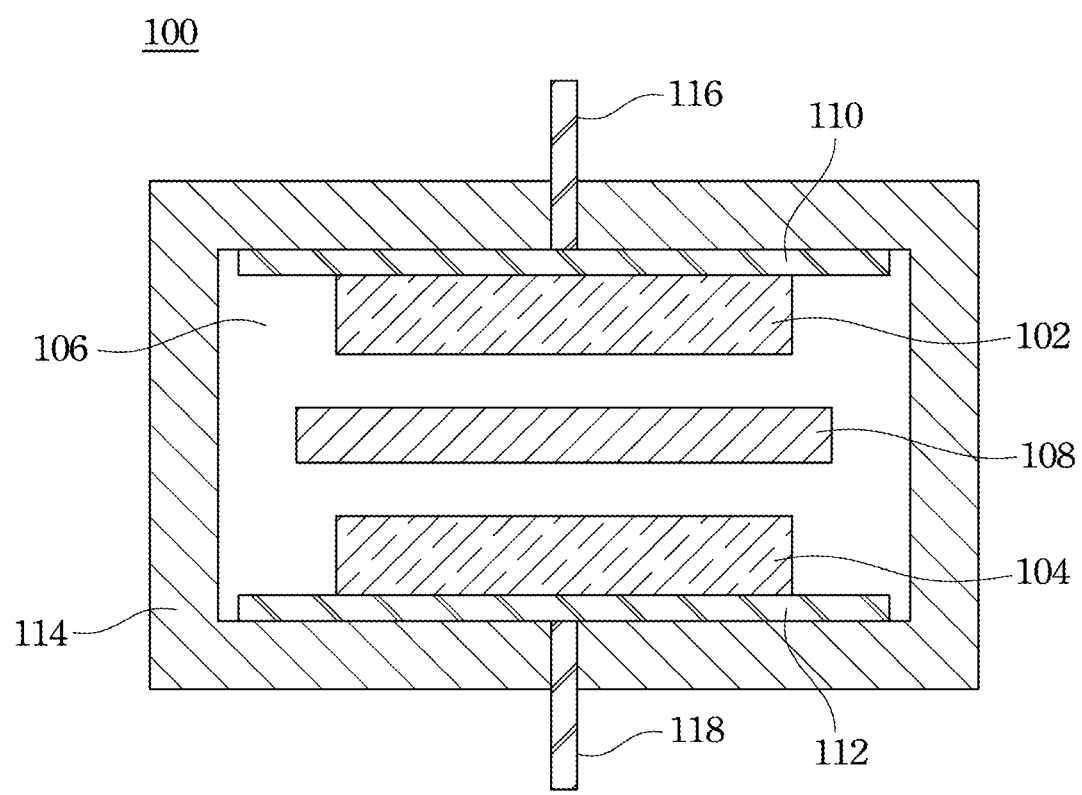

AQUEOUS ELECTROLYTE SOLUTION FOR ELECTRIC DOUBLE-LAYER CAPACITOR AND ELECTRIC DOUBLE-LAYER CAPACITOR HAVING THE SAME

CROSS-REFERENCE TO RELATED APPLICATION

This application is a continuation-in-part application of U.S. patent application Ser. No. 12/722,736, filed Mar. 12, 2010, the full disclosure of which is incorporated herein by reference.

BACKGROUND

1. Technical Field

The disclosure relates to electric double-layer capacitors. More particularly, the disclosure relates to electrolyte used in the electric double-layer capacitors.

2. Description of Related Art

Electric double-layer capacitors (EDLCs) are also known as supercapacitors. As its name suggests, the supercapacitor stores more energy per unit weight than the conventional capacitor. Furthermore, the electric double-layer capacitor exhibits better power rating than conventional rechargeable batteries during electric output. With the advantages such as long shelf life, good cycling characteristics, and wide operating temperature range, the electric double-layer capacitors have attracted attentions for their applications in energy storage and output.

Briefly, an electric double-layer capacitor includes a pair of polarizable electrodes and a separator interposed therebetween, wherein the electrodes and the separator are immersed in an electrolyte. When a potential difference is applied across the electrodes, cations in the electrolyte move toward the negative electrode whereas the anions in the electrolyte move toward the positive electrode and thereby forms an ionic current within the electric double-layer capacitor. When the positively charged- and negatively charged-ions arrive at their respective electrode, the charges would be adhered to the interface between the electrolyte and the respective electrode, whereas the electric field applied on the electrodes may keep the ions thereto and thereby may store the electric energy in the electric double-layer capacitor.

Up to now, how to decrease the internal resistance of an electric double-layer capacitor to improve its charging and discharging rates is still a hot research topic. Most of the efforts are focused on the materials of the polarizable electrodes. Many materials have been used to make the polarizable electrodes. For example, some various carbon materials, such as activated charcoal, graphene, and carbon nanotubes, some polymers having redox behavior and high surface area, and metal oxide have been used to make the polarizable electrodes. However, the internal resistance of the electric double-layer capacitors is not only affected by the internal resistance of the electrodes, but also the internal resistance of the electrolyte. But so far, not so many efforts are devoted to the electrolyte.

SUMMARY

Accordingly, one aspect of this disclosure is directed to a method for decreasing resistivity of an electrolyte for an electric double-layer capacitor. In this method, an aqueous electrolyte solution comprising $LiNO_3$ and $LiOH$ in a molar ratio of 1:9 to 9:1 is prepared first, and then purged with a gas having a flow rate of 0.8-1.2 L/min for 5-40 minutes. The gas above is nitrogen or oxygen.

According to an embodiment of this invention, a total concentration of $Li^+$ in the aqueous electrolyte solution above is better to be 1-5 M, and even better to be 1-3 M.

According to another embodiment of this invention, a concentration of oxygen in the aqueous electrolyte solution is less than 2 ppm or more than 20 ppm.

In another aspect of this invention, an electric double-layer capacitor having the gas-purging aqueous electrolyte solution above is also provided.

Since the resistivity of the electrolyte can be decreased by the method above, and thus the internal resistance of an electric double-layer capacitor can also be decreased to improve the charging and discharging rate thereof.

The above presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

Many of the attendant features will be more readily appreciated as the same becomes better understood by reference to the following detailed description considered in connection with the accompanying drawings.

BRIEF DESCRIPTION OF THE DRAWINGS

FIG. 1 is a cross-sectional schematic diagram illustrating an electric double-layer capacitor according to one embodiment of the present invention.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Method for Decreasing Resistivity of Electrolyte

In one aspect, a method for decreasing resistivity of an electrolyte for an electric double-layer capacitor is provided. In this method, an aqueous electrolyte solution comprising $LiNO_3$ and $LiOH$ in a molar ratio of 1:9 to 9:1 is prepared first. A total concentration of $Li^+$ in the aqueous electrolyte solution above is better to be 1-5 M, and even better to be 1-3 M.

Then, the aqueous electrolyte solution is purged with a gas having a flow rate of 0.8-1.2 L/min for 20-40 minutes to adjust the oxygen content of the aqueous electrolyte solution to be less than 2 ppm or more than 20 ppm. In one embodiment, the gas above can be nitrogen to decrease the oxygen content of the aqueous electrolyte solution to be less than 2 ppm. In another embodiment, the gas above can be oxygen to increase the oxygen content of the aqueous electrolyte solution to be more than 20 ppm.

Examples 3.0 M $LiNO_3$ aqueous solution and 3.0 M $LiOH$ aqueous solution were mixed in a volume ratio of 1:9 or 9:1, and thus the molar ratio is 1:9 or 9:1, to form an aqueous electrolyte solution. Then the aqueous electrolyte solution was gas-purging by purging with 1.0 L/min nitrogen or 1.0 L/min oxygen for 30 minutes. The measured oxygen content in the aqueous electrolyte solution and the resistivity of the aqueous electrolyte solution are listed in Table 1 below.

TABLE 1 measured oxygen content and resistivity of the aqueous electrolyte solution at room temperature

| Sample | Composition (V/V) | Purging Treatment | $O_2$ (ppm) | internal resistance (mΩ) |
|---|---|---|---|---|
| 1A | $LiNO_3$: LiOH (1:9) | None | 5.45 | 242 |
| 1B | | nitrogen | 1.30 | 230 |
| 1C | | oxygen | 24.98 | 230 |
| 2A | $LiNO_3$: LiOH (9:1) | None | 6.20 | 320 |
| 2B | | nitrogen | 0.87 | 297 |
| 2C | | oxygen | 22.62 | 295 |

From Table 1 above, it can be seen that the oxygen content of the aqueous electrolyte solution was either decreased to less than 2 ppm when purged with nitrogen, or increased to more than 20 ppm when purged with oxygen. Surprisingly, no matter the oxygen content was decreased or increased, the resistivity of the aqueous electrolyte solution was all decreased.

Electric Double-Layer Capacitor

Having the Gas-Purging Aqueous Electrolyte Solution

In another aspect, an electric double-layer capacitor having the gas-purging aqueous electrolyte solution above is also provided. FIG. 1 is a cross-sectional schematic diagram illustrating an electric double-layer capacitor according to one embodiment of the present invention.

In FIG. 1, the electric double-layer capacitor 100 includes a pair of polarizable electrodes 102 and 104, a separator 108, and an aqueous electrolyte solution 106. The polarizable electrodes 102 and 104 are immersed within the aqueous electrolyte solution 106. In addition, the electric double-layer capacitor 100 also includes other elements such as, a pair of current collectors 110 and 112, a housing 114 and conducting wires 116 and 118.

The polarizable electrodes 102 and 104 are used for storing the charges. Preferably, the main material of the electrodes 102 and 104 is a conductive material with high surface area, such as porous carbonaceous materials, such as carbon cloths, carbon fibers, carbon sheets or carbon powders, can be used to manufacture the polarizable electrodes 102 and 104.

The aqueous electrolyte solution 106 may contain the aqueous electrolyte solution above. For example, in one example, the aqueous electrolyte solution 106 may contain $LiNO_3$ and LiOH in a molar ratio of 1:9 to 9:1, and the total concentration of $Li^+$ in the aqueous electrolyte solution above is better to be 1-5 M, and even better to be 1-3 M.

The separator 108 is sandwiched between the pair of polarizable electrodes 102 and 104. The separator 108 is used to insulate the pair of polarizable electrodes 102 and 104 from each other so as to prevent the polarizable electrodes 102 and 104 from contacting each other and inadvertently resulting in short circuiting or rapidly depletion of the charges stored in the electrodes. Generally, the separator 108 may be porous so that the ions within the aqueous electrolyte solution 106 may pass therethrough. Example of the suitable materials of a separator 108 may include, but are not limited to, polytetrafluoroethene (PTFE), polypropylene (PP), fluorinated polymers, epoxy, acrylics and polyurethane.

The pair of current collectors 110 and 112 each is respectively disposed on each of the polarizable electrodes 102 and 104. The current collectors 110 and 112 are used to collect the charges stored in the polarizable electrodes 102 and 104, and transfer the charges to an external circuit (not shown in FIG. 1) via the conducting wires 116 and 118 penetrating through the housing 114. Generally, the material of the current collectors 110 and 112 can be a metal sheet. The metal sheet can be formed from any conductive metal material, which may be any or combinations of aluminum, copper, titanium or nickel.

Any well-known or conventionally materials and techniques may be used to form the housing 114 or other suitable encapsulating structure so as to seal the components of the electric double-layer capacitor 100 therein. For example, the housing 114 may be formed from an aluminum foil.

Examples

The prepared aqueous electrolyte solutions of the above samples were used to assemble electric double-layer capacitors below. In these examples, the polarizable electrodes of the electric double-layer capacitors were made of carbon fibers (14 $cm^2 \times 2$ mm and specific surface area 1000 $m^2/g$). The measured electric properties of the obtained electric double-layer capacitors are listed in Table 2 below.

TABLE 2 measured electric properties of electric double-layer capacitors

| Aqueous electrolyte solution | Capacitance (F) | Internal resistance (Ω) | *Ohmic potential drop (V) | Leakage current (mA) | 1 sec Max peak current (A) |
|---|---|---|---|---|---|
| 1A | 18.5 | 1.18 | 0.826 | 1.4 | 0.14 |
| 1B | 20.2 | 0.93 | 0.997 | 1.3 | 4.57 |
| 1C | 19.2 | 0.46 | 0.950 | 1.2 | 0.48 |
| 2A | 18.9 | 1.21 | 0.904 | 4.3 | 0.25 |
| 2B | 14.5 | 1.09 | 0.912 | 1.6 | 0.27 |
| 2C | 14.2 | 0.99 | 0.926 | 1.3 | 0.32 |

*The applied voltage of the electric double-layer capacitors is 1 V. Therefore, the more the ohmic potential drop is close to 1 V, the better performance the electric double-layer capacitor has.

From Table 2 above, it can be known that the capacitance and the ohmic potential drop of the electric double-layer capacitors with the gas-purging aqueous electrolyte solution (samples 1B, 1C, 2B, and 2C) were comparable to or better than the electric double-layer capacitors with non-gas-purging ones (samples 1A and 2A). But, surprisingly, the internal resistance of the electric double-layer capacitors with gas-purging aqueous electrolyte solution (samples 1B, 1C, 2B, and 2C) were all smaller than the electric double-layer capacitors with the non-gas-purging ones (samples 1A and 2A), especially the sample 1C. Moreover, the 1 sec maximum peak current of the electric double-layer capacitors with gas-purging aqueous electrolyte solution (samples 1B, 1C, 2B, and 2C) were all larger than the electric double-layer capacitors with the non-gas-purging ones (samples 1A and 2A), especially the sample 1B.

Accordingly, since the resistivity of the aqueous electrolyte solution can be surprisingly decreased by the method above, and thus the internal resistance of an electric double-layer capacitor can also be decreased to improve the charging and discharging rate thereof. In addition, the 1 sec maximum peak current of the electric double-layer capacitors is also surprisingly increased.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A method for decreasing resistivity of an electrolyte for an electric double-layer capacitor, comprising:
   preparing an aqueous electrolyte solution comprising $LiNO_3$ and LiOH in a molar ratio of 1:9 to 9:1; and
   purging the aqueous electrolyte solution with a gas having a flow rate of 0.8-1.2 L/min for 5-40 minutes, wherein the gas is nitrogen or oxygen.

2. The method of claim 1, wherein a total concentration of $Li^+$ in the aqueous electrolyte solution is 1-5 M.

3. The method of claim 1, wherein a concentration of oxygen in the aqueous electrolyte solution is less than 2 ppm or more than 20 ppm.

4. The method of claim 1, wherein the aqueous electrolyte solution comprises $LiNO_3$ and LiOH in a molar ratio of 1:9, and is purged with oxygen.

5. An electric double-layer capacitor, comprising an aqueous electrolyte solution prepared by the method of claim 1.

6. The electric double-layer capacitor of claim 5, wherein a concentration of oxygen in the aqueous electrolyte solution is less than 2 ppm or more than 20 ppm.

7. The electric double-layer capacitor of claim 5, wherein a total concentration of $Li^+$ in the aqueous electrolyte solution is 1-5 M.

8. The electric double-layer capacitor of claim 5, further comprising:
   a pair of polarizable electrodes immersed with the aqueous electrolyte solution; and
   a separator disposed between the pair of polarizable electrodes.

9. The electric double-layer capacitor of claim 8, wherein the pair of polarizable electrodes comprises a carbonaceous material.

10. The electric double-layer capacitor of claim 8, further comprising a pair of current collectors respectively disposed on a respective surface of the polarizable electrodes.

11. The electric double-layer capacitor of claim 5, wherein the aqueous electrolyte solution comprises $LiNO_3$ and LiOH in a molar ratio of 1:9, and the oxygen content of the aqueous electrolyte solution is less than 2 ppm.

* * * * *